United States Patent
Wilcox et al.

(10) Patent No.: US 7,315,952 B2
(45) Date of Patent: Jan. 1, 2008

(54) POWER STATE COORDINATION BETWEEN DEVICES SHARING POWER-MANAGED RESOURCES

(75) Inventors: Jeffrey R. Wilcox, Folsom, CA (US); Shivnandan Kaushik, Portland, OR (US); Stephen H. Gunther, Beaverton, OR (US); Devadatta V. Bodas, Federal Way, WA (US); Siva Ramakrishnan, Beaverton, OR (US); David Poisner, Folsom, CA (US); Lance E. Hacking, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 288 days.

(21) Appl. No.: 10/871,638

(22) Filed: Jun. 17, 2004

(65) Prior Publication Data

US 2005/0273635 A1    Dec. 8, 2005

Related U.S. Application Data

(63) Continuation-in-part of application No. 10/859,892, filed on Jun. 2, 2004.

(51) Int. Cl.
    *G06F 1/26* (2006.01)
(52) U.S. Cl. .................. 713/320; 713/300; 713/330; 455/522; 307/35
(58) Field of Classification Search .............. 713/300, 713/320, 323, 324, 330; 307/35; 455/522
    See application file for complete search history.

(56) References Cited

U.S. PATENT DOCUMENTS

| | | | |
|---|---|---|---|
| 5,388,265 A | | 2/1995 | Volk |
| 5,598,537 A | * | 1/1997 | Swanstrom et al. ........ 710/304 |
| 5,752,050 A | * | 5/1998 | Hernandez et al. ......... 713/330 |
| 5,784,628 A | * | 7/1998 | Reneris ....................... 713/300 |
| 5,842,027 A | * | 11/1998 | Oprescu et al. ............. 713/300 |
| 5,905,900 A | | 5/1999 | Combs et al. |
| 6,125,450 A | | 9/2000 | Kardach |
| 6,760,852 B1 | | 7/2004 | Gulick |
| 6,971,033 B2 | | 11/2005 | Ma |
| 7,028,200 B2 | | 4/2006 | Ma |
| 2003/0041272 A1 | | 2/2003 | Nguyen |
| 2003/0163745 A1 | * | 8/2003 | Kardach ..................... 713/320 |
| 2003/0221026 A1 | | 11/2003 | Newman |
| 2004/0022225 A1 | | 2/2004 | Liang et al. |
| 2004/0025063 A1 | | 2/2004 | Riley |
| 2005/0113103 A1 | * | 5/2005 | Snowden et al. ........... 455/451 |
| 2005/0136961 A1 | * | 6/2005 | Simonsson et al. ......... 455/522 |

(Continued)

FOREIGN PATENT DOCUMENTS

WO    WO 2004/070619 A3    8/2004

OTHER PUBLICATIONS

Office Action issued in U.S. Appl. No. 10/859,892, mailed Jul. 25, 2006, 10 pgs.

(Continued)

*Primary Examiner*—Thomas Lee
*Assistant Examiner*—Malcolm D Cribbs
(74) *Attorney, Agent, or Firm*—Blakely, Sokoloff, Taylor & Zafman LLP

(57) ABSTRACT

Methods and apparatuses for coordination of power state management in and electronic system.

29 Claims, 5 Drawing Sheets

U.S. PATENT DOCUMENTS

2005/0273633 A1* 12/2005 Wilcox et al. .............. 713/300

OTHER PUBLICATIONS

Office Action from UK Patent Application No. 0425264.9, mailed Sep. 22, 2006, 6 pgs.

Office Action from UK Patent Application No. 0609876.8, mailed Sep. 22, 2006, 5 pgs.

Office Action from U.S. Appl. No. 10/859,892, mailed Dec. 6, 2006, 9 pgs.

First Office Action (and English translation) from CN Application No. 200410101227.1, mailed Dec. 1, 2006, 27 pgs.

Abstract from WO0219078, corresponding to reference CN1449517A cited in CN OA above, 7 pgs.

* cited by examiner

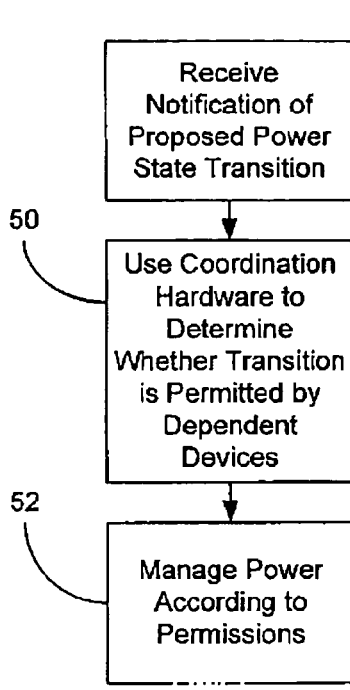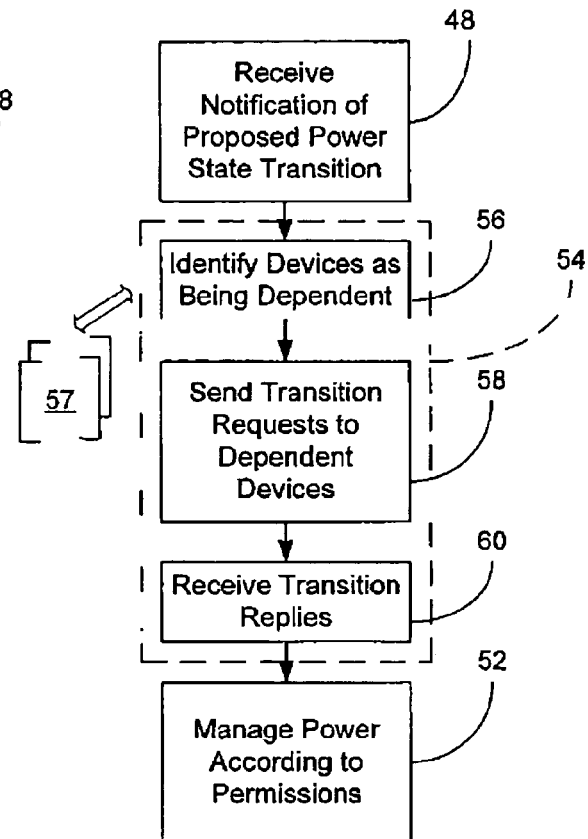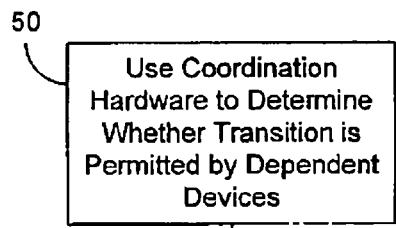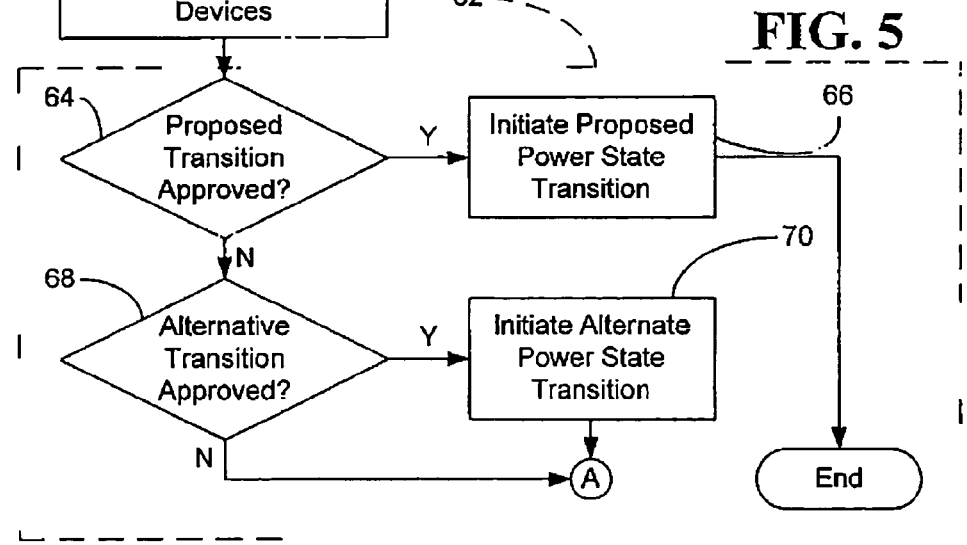

POWER STATE COORDINATION BETWEEN DEVICES SHARING POWER-MANAGED RESOURCES

RELATED APPLICATIONS

This U.S. patent application is a continuation-in-part of U.S. patent application Ser. No. 10/859,892, filed Jun. 2, 2004.

TECHNICAL FIELD

Embodiments of the invention relate generally to computing systems. More particularly, embodiments of the invention relate to message exchanges for controlling computing system operational (e.g., power) modes.

BACKGROUND

Power management in modem computer systems plays an important role in conserving energy, managing heat dissipation, and improving system performance. For example, modem computer systems are often designed for use in settings where a reliable external power supply is not available, making power management important for energy conservation. Even when reliable external power supplies are available, power management within the computing system can reduce heat produced by the system enabling improved performance of the system. Computing systems generally have better performance at lower ambient temperatures because key components can run at higher speeds without damaging their circuitry.

One approach to power management involves the implementation of various power states in system devices, where placing a device into a relatively low power state reduces energy consumption. The tradeoff to operating a device in a low power state is typically a reduction in the level of performance of the device. It should be noted, however, that the operation of some devices might in fact be dependent upon on the operation of other devices. For example, a processor might have a cache that is snooped by other processors, where placing the processor in a lower power state could negatively affect snoop latencies experienced by the other processors. Simply put, a power state transition in one device may prevent other devices from functioning at a desired level of performance.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 3 is a flowchart of an example of a method of managing power state transitions;

FIG. 4 is a flowchart of an example of a process of using coordination agent to determine whether a power state transition in a primary device is permitted by a set of secondary devices;

FIG. 5 is a flowchart of an example of a process of managing power based on secondary device permissions.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Hardware System Overview

Figure 1:
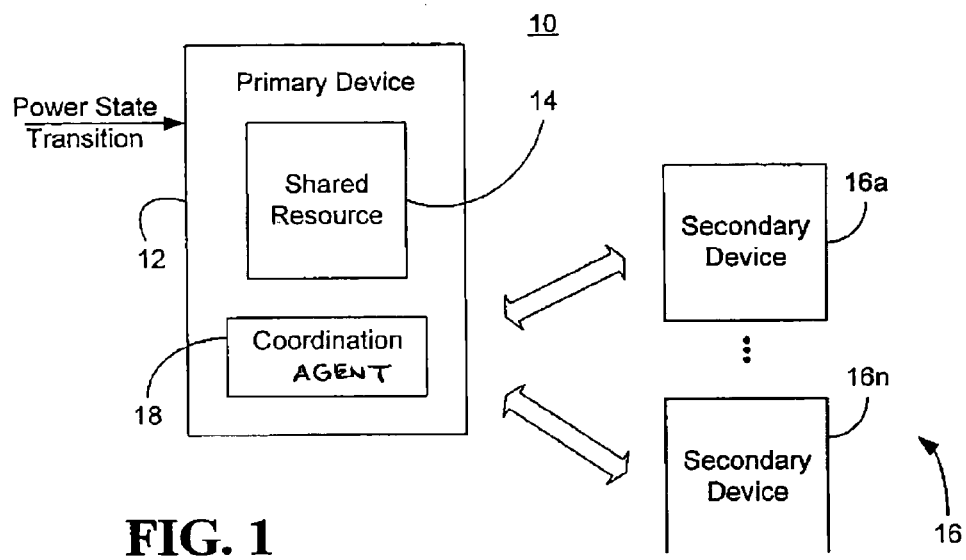
FIG. 1 is a block diagram of an example of a system having coordination agent.

FIG. 1 shows a system 10 in which a primary device 12 shares a resource 14 with a set of secondary devices 16 (16a-16n). The resource 14 can be a memory structure, controller, interface, etc., and the term "device" is used to refer to any physical agent or node of a system. Examples of devices include, but are not limited to, processors, graphics controllers and cache controllers. It should also be noted that the primary device 12 could have multiple shared resources. Furthermore, the terms "primary" and "secondary" are only used for ease of discussion and can apply to any of the devices shown depending on the perspective from which the discussion is made.

Because the primary device 12 and the secondary devices 16 share the resource 14, power state changes within the primary device 12 have the potential to negatively (or positively) affect the performance of the secondary devices 16. Accordingly, in one embodiment, the primary device 12 uses coordination agent 18 to determine whether pending power the secondary devices 16 permit state transitions in the primary device 12. In an alternate embodiment, coordination agent 18 can be implemented in software, or a combination of hardware and software.

In one embodiment, the coordination agent can include, for example, an embedded logic circuit of an application specific integrated circuit (ASIC) or any other commercially available hardware component. By using coordination agent 18 to resolve the dependency issues associated with power state transitions, or other operating state transitions, the system 10 is able to achieve greater efficiency and enhanced performance. For example, the coordination agent 18 functions based on the dependencies associated with power state transitions in the primary device 12, and does not require knowledge of other system dependencies. As a result, systems having a relatively large number of interdependent devices and/or components can benefit from reduced complexity.

Although the coordination agent 18 is shown as being incorporated into the primary device 12, the coordination agent 18 could also be implemented in a separate device and/or package. Furthermore, the number of devices can vary depending upon the circumstances. As already noted, the terms "primary" and "secondary" are only used to facilitate the discussion. For example, the device 16a could also be viewed as a primary device with respect to coordination agent within the device 16a. Likewise, the device 12 could be viewed as a secondary device from the perspective of the device 16a (provided the device 12 depends upon power state transitions within the device 16a).

Figure 2A:
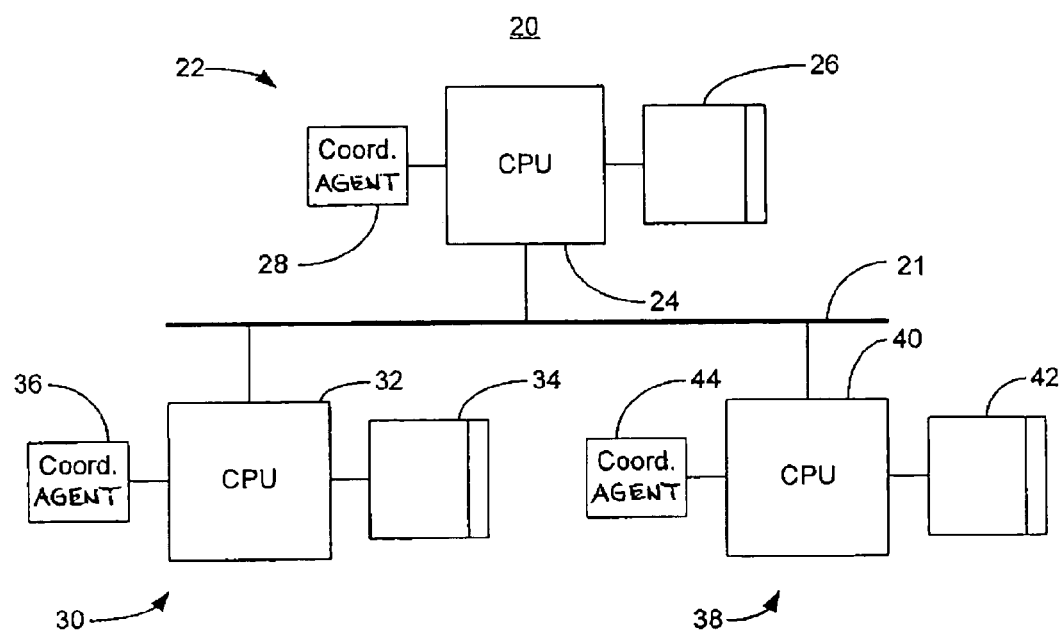
FIG. 2A is a diagram of an example of a computer system.

Turning now to FIG. 2A, a computer system 20 is shown to illustrate certain advantages associated with the principles described herein. In particular, a first processor node 22 has a first processor 24, a first cache 26 and first coordination agent 28. Similarly, a second processor node 30 includes a second processor 32, a second cache 34 and second coordination agent 36, and a third processor node 38 includes a third processor 40, a third cache 42 and third coordination agent 44.

Assume, for example, that the first cache 26 is coherent with the second cache 34 and the third cache 42, and therefore must be "snooped" by the second and third processors 32, 40 in order to ensure coherency. Assume further that the first processor node 22 receives a notification of a planned power state transition in the first processor 24. The power state transition might be from state "P2" to "P4", where state P4 provides lower power consumption and lower performance for the first processor 24 than state P2. Lower performance could be characterized by the suspension of certain features, where different power states suspend different features. Therefore, the above example of a transition from state P2 to P4 might result in a higher latency and/or decrease in bandwidth. It should be noted that alternatively, the transition could be to a state that provides higher power consumption and performance.

The coordination agent 28 identifies the second and third processor nodes 30, 38 as being dependent upon the power state transition. The identification can be made by consulting either an explicit or an implicit dependencies list that is dedicated to the first processor node 22. The dependencies list may be generated by a number of different mechanisms. For example, the list could be stored in a register by basis input/output system (BIOS) software or a system management controller at the time of startup. The dependencies list can also take on a number of different formats. For example, a single list could be used for every state type and level being coordinated. Alternatively, there could be a unique list for each state type and level. It should be noted that the dependencies list could be implicit in cases where all secondary devices in the system are deemed to be dependent on state transitions in the primary device. In such a case, a list would not need to be consulted. One example of this type of scenario could be a system having only two nodes.

Once the appropriate dependencies have been identified, the coordination agent 28 then queries the second and third processor nodes 30, 38 to determine whether the power state transition is permitted. Depending upon the status of each of the processors 32, 40 and their respective power management policies, the power state transition may or may not be permitted. For example, the second processor 32 may not be currently running a thread and could therefore have a policy that permits the transition. On the other hand, the third processor 40 could be running a high priority thread and anticipating the need to snoop the first cache 26. If, for example, the software controlling the third processor 40 requires a minimum power state level of P2 under these conditions, the transition to level P4 would be denied. In such a case, since all of the processors dependent upon the transition have not approved the power state transition, the first processor 24 would remain in power state P2.

Figure 2B:
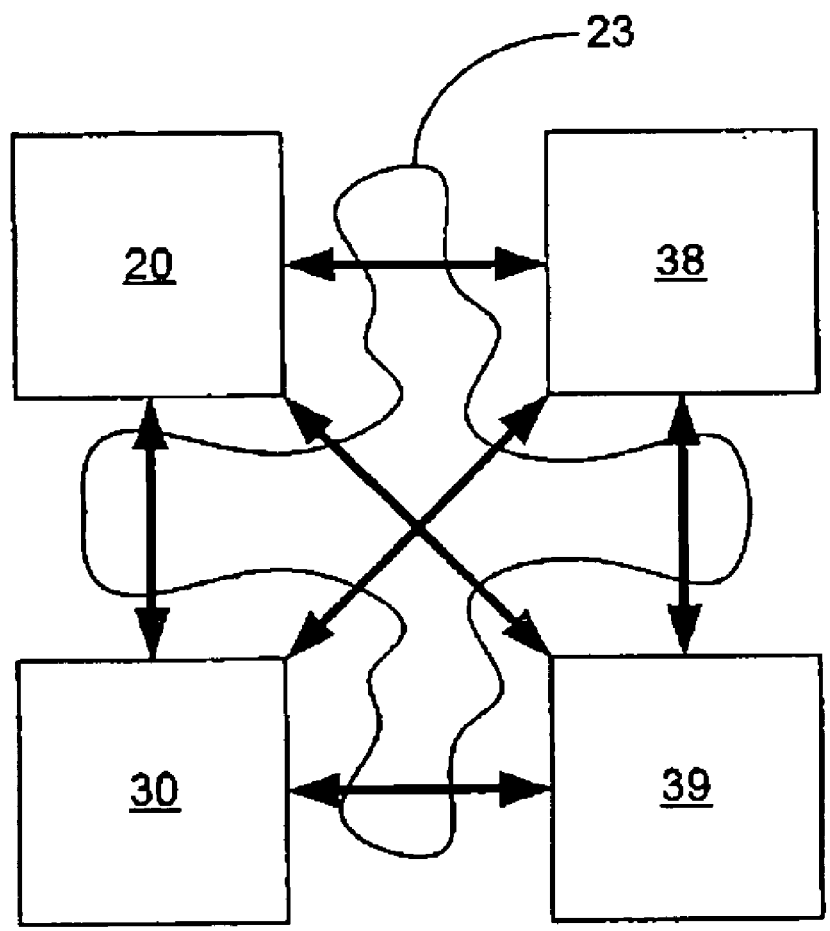
FIG. 2B is a diagram of a second example of a computer system.

Although the processor nodes 20, 30 and 38 are shown as being interconnected by a single interface 21, other approaches to connecting the devices can be used. For example, multiple buses and intermediate bridges between the buses can be incorporated in to the interface 21. Indeed, the interface 21 can represent a portion of a point-to-point fabric, which interconnects all of the devices in the computer system 20. An example of such a topology is shown in FIG. 2B.

In the illustrated embodiment, a point-to-point network interconnect 23 is coupled to processor nodes 20, 30, 38 and 39. In the point-to-point fabric topology, each node has a direct link to other nodes in the system. The network interconnect 23 can also have a layered communication protocol in which power management messages are transferred between nodes in packets at a protocol layer. Packets are data structures having a header and payload; where, the header includes "routing information" such as the source address and/or destination address of the packet; and/or, a connection identifier that identifies a connection that effectively exists in the network interconnect 23 to transport the packet. Other layers such as transport, routing, link and physical layers can reside beneath the protocol layer in the hierarchy.

Power Management Techniques

In one embodiment, a coordination agent residing in an electronic system having one or more resources shared by multiple devices may include functionality to cause a processor or other primary device to transition to a lower power state. The coordination agent can be implemented as hardware, software or any combination of hardware and software. The coordination agent may not have visibility as to the requirements of secondary devices that depend on a shared resource when the primary device is to be transitioned to the lower power state. For example, a processor having a cache that is accessible by other processors may be targeted for transition to a lower power state, but one or more of the other processors may require access to the cache and may not be visible to the coordination agent.

When a secondary device depends on a resource that may experience a power (or performance) state change, the secondary device may provide feedback to the coordination agent (or primary device) regarding the dependency. This feedback may provide the coordination agent with information not available from the primary device, which may allow the coordination agent to provide better power management. Without the feedback, an autonomous action by the coordination agent with respect to the primary device could have a debilitating impact on secondary devices.

Described in greater detail below is a mechanism whereby the primary device and/or coordination agent coupled to a communications fabric can query secondary devices that depend on a shared resource in order to determine whether a change in power or operational state may adversely affect the secondary devices. This coordination mechanism provides increased power/performance functionality as compared to a system without the coordination mechanism.

In one embodiment, the power management mechanism may determine two power state values. The first power state value may be referred to as the "desired state," which may correspond to the state in which the coordination agent would place the primary device if no secondary devices depend on the shared resource. The second power state value may be referred to as the "allowed state," which may correspond to the state that is allowed by the secondary devices that depend on the shared resource. Thus, the resulting power state of the primary device may be different than the desired state because the primary device may not be allowed to transition to the desired power state based on responses from the secondary devices.

In one embodiment, when the coordination agent receives an indication of a power state transition, for example, from system software (or initiates a transition to a different power state) for the primary device, the coordination agent (or primary device) may collect feedback from one or more secondary devices that have dependencies upon the shared resource.

As an example, the primary device may be a processor that is to be transitioned to a sleep state where the processor cache may not be available to other system processors for snoops for many microseconds. In one embodiment, the coordination agent or the processor obtains "permission" through feedback from secondary devices (e.g., the other processors) to transition to the sleep state. That is, devices that may snoop the processor cache may provide feedback to the coordination agent or processor regarding the state transition.

In one embodiment, in order to solicit feedback from dependent resources, the coordination agent or primary device may send a message to each secondary device. Dependencies may be determined, for example, by checking a dependency list that is created by system management software or system BIOS (basic input/output system).

In one embodiment, the message sent to the secondary devices indicates that the target device may make a power state transition and, optionally, the desired state. Secondary devices that receive the message may respond by indicating a power state that would be allowable without detrimentally affecting performance of the secondary device. In some situations, though not all, the allowable state as indicated by the secondary devices may correspond to the power state of the secondary device.

In one embodiment, when the coordination agent (or primary device) receives responses from one or more secondary devices, a power state can be determined. The power state to be used for the primary device may be, for example, the highest power/performance level state from the set of the desired power sate and the allowable power states as indicated by the secondary devices. This results in the selection of performance over power savings. In alternate embodiments, other states may be selected, for example, the lowest power state, which selects power savings over performance.

In one embodiment, secondary devices may take no power state transition in response to the request message. In one embodiment, a secondary system device may not receive or process response messages from other secondary devices. Further, the secondary device may not receive an indication of the power state to which the primary device has transitioned.

In one embodiment, a retry mechanism that supports re-querying can be provided. The retry mechanism may be invoked, for example, when system conditions change that may affect the result of a previous power state transition. In one embodiment, a retry bit may be included in a request message to indicate whether the message is an initial request message or a retry request message. The state of the retry bit may allow a device to determine whether a power state or other condition has changed. Multiple retry techniques are described in greater detail below.

FIG. 3 shows a method 46 of managing power. The method 46 can be implemented as an embedded logic circuit of an ASIC or any other commercially available hardware technique, as already discussed. Processing block 48 provides for receiving notification of a pending power state transition in a primary device. Typically, the notification will be received from software, although the notification may also be received from a hardware component such as a hardware-based monitor performing targeted performance feedback. In one embodiment, coordination agent is used at block 50 to determine whether the power state transition is permitted by a set of secondary devices and block 52 provides for managing power for the primary device according to the permissions, as described above.

Turning now to FIG. 4, one approach to using a coordination agent to determine whether a power state transition is permitted is shown in greater detail at block 54. Accordingly, block 54 can be readily substituted for block 50 (FIG. 3) discussed above. Specifically, each device in the set of secondary devices is identified as being dependent on the power state transition at block 56. As already noted, identifying the dependent devices can be accomplished by accessing either an explicit or an implicit dependencies list 57, where the dependencies list is dedicated to the primary device. Block 58 provides for sending a set of transition requests to the set of secondary devices and block 60 provides for receiving a set of transition replies from the set of secondary devices, where each transition reply indicates whether the power state transition is permitted.

FIG. 5 shows one approach to managing power for the primary device according to secondary device permissions in greater detail at block 62. Accordingly, block 62 can be readily substituted for block 52 (FIG. 3) discussed above. In particular, block 64 provides for determining whether all of the transition replies indicate that the proposed power state transition is approved. If so, the proposed power state transition is initiated in the primary device at block 66. Otherwise, it is determined at block 68 whether one or more of the transition replies indicate that an alternative power state transition is permitted. In particular, if the proposed power state transition is to a lower state, the alternative power state might be an intermediate state between the current state and the proposed state. For example, the proposed power state transition could be from P2 to P4, where one of the secondary devices will only permit a transition from P2 to P3. The alternative power state transition can be determined by hardware and/or software performance monitors of a limiting secondary device, where the limiting secondary device transmits the alternative power state transition to the primary device in a transition reply. If an alternative power state is identified, block 70 provides for initiating the alternative power state in the primary device.

Figure 6:
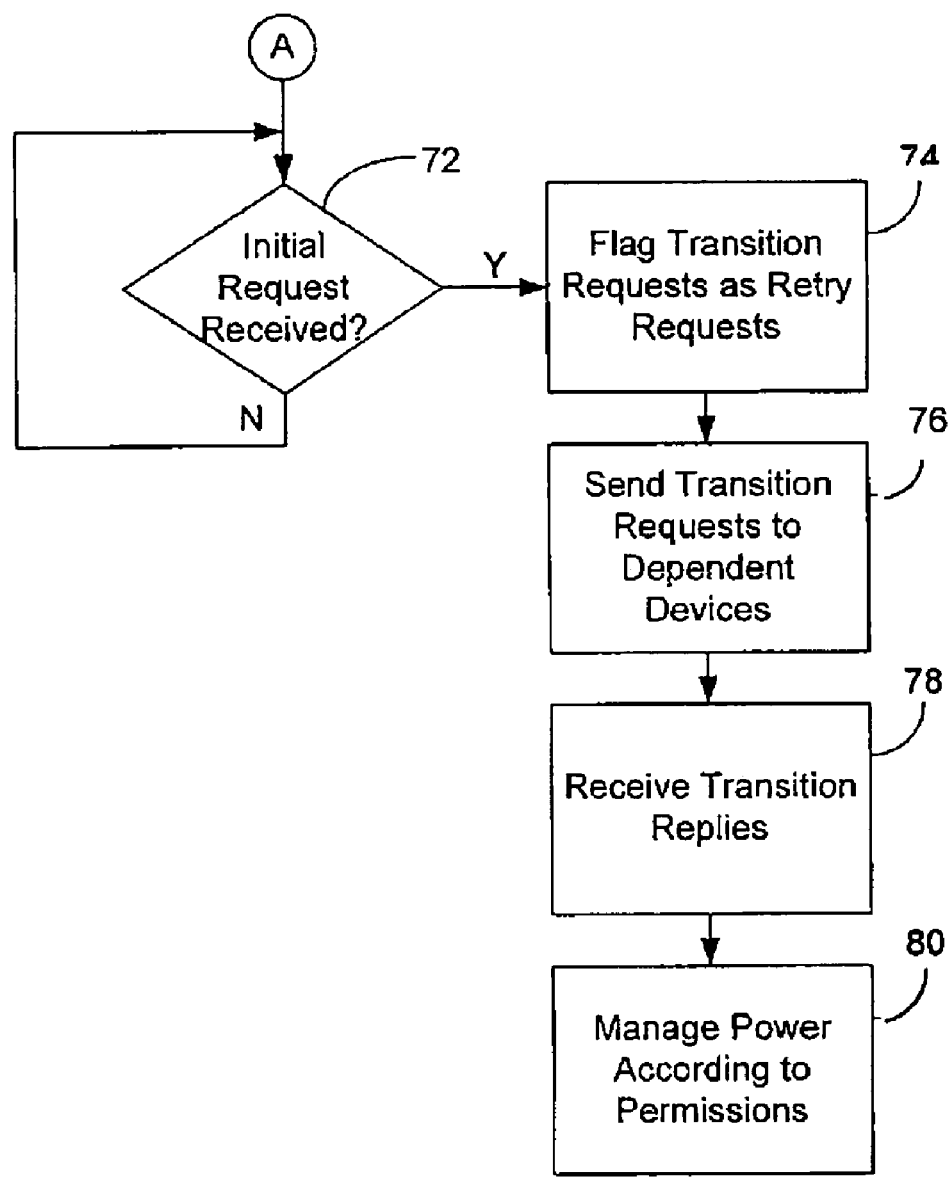
FIG. 6 is a flowchart of an example of a retry protocol.

FIG. 6 is a flowchart of an example of a retry protocol. If so, each of the transition requests is flagged as a retry request at block 74 and the transition requests are re-sent to the secondary devices at block 76. Block 78 provides for receiving a set of transition replies and block 80 provides for managing the power of the primary device based on the replies. Alternatively, the primary device could simply poll the secondary devices periodically (i.e., repeat the re-sending on a periodic basis) in order to determine whether the initial request is permitted due to a change in the blocking condition. Such an approach would provide greater simplicity at the possible expense of lower performance and higher energy consumption.

One specific example of a retry protocol can be used after a primary device has attempted a transition to a lower power state and the result was a transition to a state having a non-optimum power level from the perspective of the primary device (i.e., no change or a change to some intermediate state). Since the primary device is not at the initially requested state, the primary device can make another attempt to transition to the initially requested state once the "blocking" conditions are no longer present. In such a case, if the primary device receives an initial transition request from one of the secondary devices, the request serves as an indication that the blocking condition may no longer be present because an initial transition request implies some sort of change in the power conditions of the transmitting device. The retry bit therefore informs the receiving secondary device as to whether or not a retry is necessary when a new request is detected.

Otherwise, devices could engage in a perpetual exchange of retry requests (i.e., a "deadlocking" condition) because none of the devices are able to distinguish between an incoming request representing an actual power condition change and one merely representing a retry. In order to determine whether the initially requested state is allowable, the primary device re-sends the transition requests as retry requests.

Another example of a retry protocol can be implemented when a transition to a higher power state is requested by a secondary device (i.e., an "increasing" secondary device). In such a case, an increase in the power state of the primary device may also require an increase in the power levels of the remaining secondary devices to meet the performance requirements of the device initiating the increase. Accordingly, a primary device may re-send transition requests when a secondary device requests an increase in power state. Simply put, when a device detects an initial request to a power state that is higher than its own power state, the device can issue retry requests to determine its new coordinated power state level.

Yet another example of a retry protocol can be used when a primary device has sent a transition request (either an initial or a retry request) and it receives an initial request from a secondary device before it has received replies from all of the secondary devices. Such a case would indicate that there is a possibility that some of the replies are stale and that retry requests should be issued.

Figure 7:
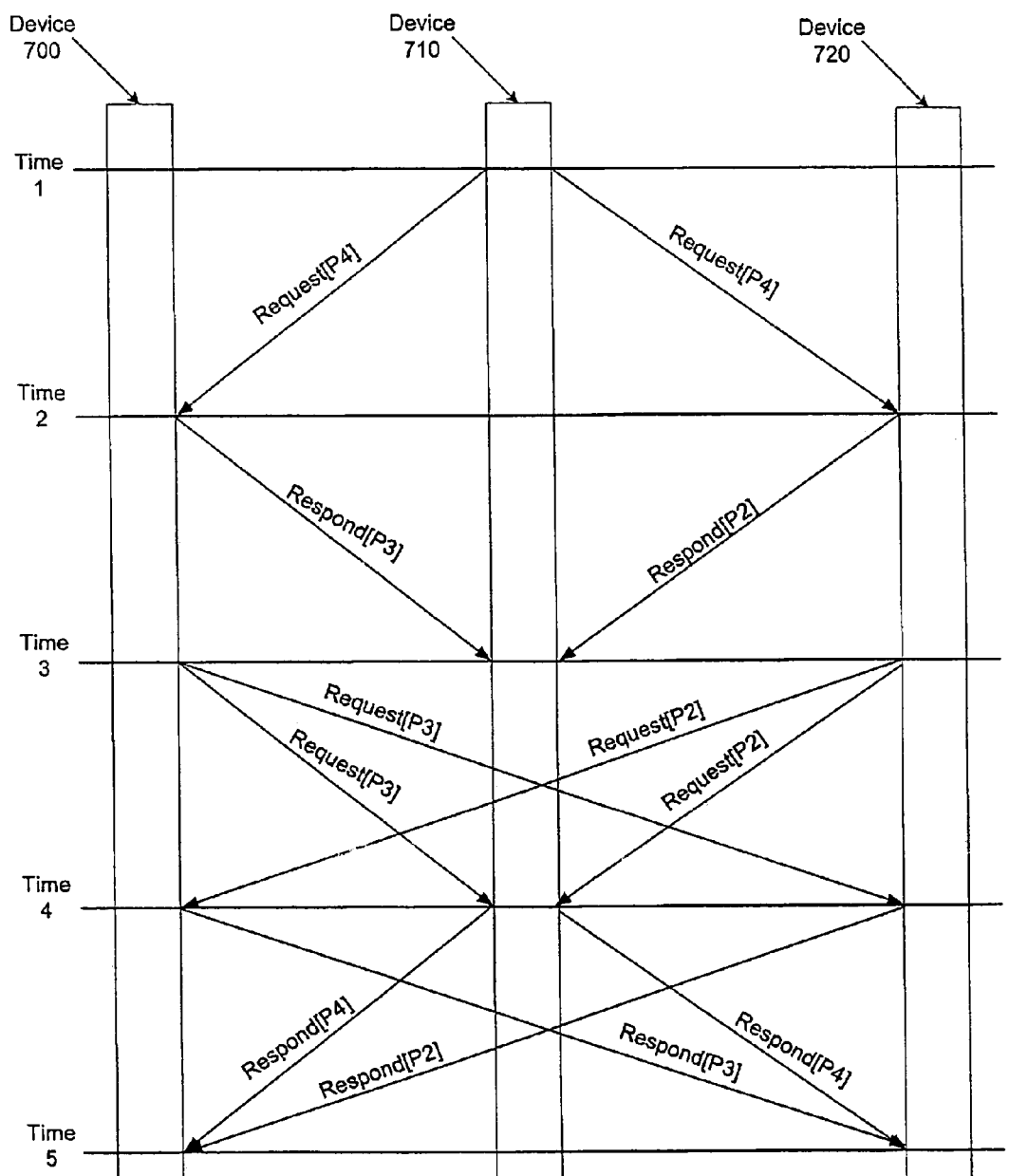
FIG. 7 is a diagram of an example of a power state change request and response exchange.

FIG. 7 is a diagram of an example of a power state change request and response exchange. The example of FIG. 7 includes three devices (700, 710 and 720) that pass messages to coordinate power state changes. The example of FIG. 7 is limited to three devices for reasons of simplicity of description. Any number of devices can be supported with messaging protocol described herein. The example of FIG. 7 further includes time indications (Time 1, Time 2, Time 3, Time 4 and Time 5). These time indications are illustrated to provide a general concept of the temporal relationships of various messages and are not intended to represent strict timing requirements.

At Time 1, device 710 receives an indication of change in desired power state from P1 (the current power state) to P4 (a lower power state). The indication may be received from, for example, a power control agent or operating system software. In response to the indication, a coordination agent (or device 710) sends messages (labeled "Request[P4]") to nodes 700 and 720 indicating the intended power state change. The message may include, for example, a retry bit, an indication of the current power state and/or the desired power state.

At Time 2, devices 700 and 720 receive the initial request from device 710. In one embodiment, in response to the initial request, the receiving (secondary) devices generate responses indicating allowable power states for device 710 from the perspective of the receiving devices. In the example of FIG. 7, device 700 responds with an allowable power state of P3 and device 720 responds with an allowable power state of P2.

At Time 3, device 710 (or coordination agent) receives the responses from devices 700 and 720 and determines a power state for device 710. In one embodiment, device 710 may transition to a highest allowable power state. In such an embodiment, device 710 would transition to a power state of P2 as indicated by device 720. In an alternate embodiment, device 710 may transition to a lowest allowable power state. In such an embodiment, device 710 would transition to a power state of P3 as indicated by device 700. In another alternate embodiment, a different power state, for example, an intermediate power state can be used by device 710.

In one embodiment, at Time 3, devices 700 and 720 can issue retry messages (Request[P3] from device 700 and Request [P2] from device 720) because devices 700 and 720 were not in the desired states when the initial request was received from device 710.

At Time 4, devices 700 and 710 receive a retry request message from device 720 requesting a transition to power state P2. Similarly, devices 710 and 720 receive a retry request message from device 700 requesting a transition to power state P3. In response to the retry request messages, device 710 issues a response message indicating the power state P4 is allowable because device 710 is in the P4 power state. Similarly, in response to the retry request messages, device 700 issues a response message indicating the power state P3 is allowable because device 700 is in the P3 power state and device 720 issues a response message indicating the power state P2 is allowable because device 720 is in the P2 power state.

At Time 5, device 700 receives the response messages from devices 710 and 720 indicating that power states P4 and P2, respectively, are allowable. In one embodiment, in response to receiving the response messages, device 700 transitions to a power state of P2. Also, at Time 5, device 720 receives the response messages from devices 700 and 700 indicating that power states P3 and P4, respectively, are allowable. In one embodiment, in response to receiving the response messages, device 720 transitions to a power state of P3.

The example of FIG. 7 results in each of devices 700, 710 and 720 transitioning to a different power state than at Time 1. The coordinated transition of power states as described with respect to FIG. 7 can provide in an increased overall system efficiency by balancing the power and performance requirements of multiple system devices.

CONCLUSION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:

transmitting a message indicating a potential change of operational state for a primary device in an electronic system to one or more respective secondary devices within the electronic system;

receiving one or more responses to the message from the one or more respective secondary devices within the electronic system coupled with the primary device indicating allowable operational states of the primary device indicated by the one or more secondary devices;

comparing a target operational state for the primary device to one or more allowable operational states for the primary device as indicated by the responses received from the secondary devices; and causing the primary device to transition to one of the target operational state and the one or more allowable operational states.

2. The method of claim 1 further comprising initiating an alternative operational state transition in the primary device if one or more of the responses indicate that the alternative power state transition is permitted, the alternative power state transition being based on a performance requirement of at least one of the secondary devices.

3. The method of claim 1 wherein transmitting the message indicating the potential change of operational state for the primary device comprises:

receiving notification of a pending power state transition; and using coordination agent to generate a message to be transmitted to one or more secondary devices to determine whether the power state transition in a primary device is permitted by the one or more secondary devices, the primary device sharing a resource with the set of secondary devices.

4. The method of claim 1 wherein causing the primary device to transition to one of the target power state and the one or more allowable power states comprises causing the primary power state to transition to a highest power state from the target power state and the one or more allowable power states.

5. The method of claim 1 wherein causing the primary device to transition to one of the target power state and the one or more allowable power states comprises causing the primary power state to transition to a lowest power state from the target power state and the one or more allowable power states.

6. The method of claim 1 wherein the operational state comprises a power state.

7. The method of claim 1 wherein the operational state comprises a perfomance state.

8. The method of claim 1 further comprising:

transmitting a subsequent message indicating a potential change of operational state for the primary device;

indicating the subsequent message as a retry message;

receiving one or more subsequent responses to the subsequent message from one or more respective secondary devices coupled with the primary device indicating allowable operational states of the primary device indicated by the one or more secondary devices; and transitioning the primary device to a subsequent operational state determined based on the subsequent responses received from the secondary devices.

9. The method of claim 1 further comprising:

transmitting a message indicating a potential change of operational state for one of the secondary devices;

indicating a subsequent message as a retry message; and transitioning the primary device to a selected operational state determined based on responses received from the secondary devices.

10. The method of claim 1 further comprising:

transmitting a message indicating a potential change of operational state for a selected one of the secondary devices;

indicating a subsequent message as a retry message; and transitioning the selected secondary device to an operational state determined based on responses received from the other secondary devices.

11. An apparatus comprising:

a primary device within an electronic system having a resource to be shared with one or more secondary devices within the electronic system coupled with the primary device; and a coordination agent within the electronic system coupled with the primary device and the one or more secondary devices to transmit a message indicating a potential change of operational state for a primary device to the one or more secondary devices, to compare a target operational state for the primary device to one or more allowable operational states for the primary device as indicated by responses received from the secondary devices, and to cause the primary device to transition to one of the target operational state and one of the one or more allowable operational states.

12. The apparatus of claim 11, wherein the coordination agent receives notification of a power state transition, identifies secondary devices as being dependent on a power state transition, sends the message to the secondary devices, receives the responses from the secondary devices.

13. The apparatus of claim 11, wherein the primary device comprises a processor, the resource comprises a cache memory, and at least one of the secondary devices comprises a processor.

14. The apparatus of claim 11, wherein the coordination agent is coupled to access at least one of an explicit and an implicit dependencies list to identify secondary devices as being dependent on a power state transition, the dependencies list to be dedicated to the primary device.

15. The apparatus of claim 11 wherein the operational state comprises a power state.

16. The apparatus of claim 11 wherein the operational state comprises a performance state.

17. The apparatus of claim 11 wherein the coordination agent comprises circuitry in an electronic system.

18. The apparatus of claim 11 wherein the coordination agent comprises circuitry configured to communicate with multiple devices configured as a network of wireless devices.

19. The apparatus of claim 11 wherein the coordination agent causes the primary device to transition to a highest power state from a target power state as indicated by the message and one or more allowable power states as indicated by the responses.

20. The apparatus of claim 11 wherein the coordination agent causes the primary device to transition to a lowest power state from a target power state as indicated by the message and one or more allowable power states as indicated by the responses.

21. A system comprising:

a digital signal processor;

a primary device within an electronic system having a resource to be shared with one or more secondary devices within the electronic system coupled with the primary device; and a coordination agent within the electronic system coupled with the primary device and the one or more secondary devices to transmit a message indicating a potential change of operational state for a primary device to the one or more secondary devices, to compare a target operational state for the primary device to one or more allowable operational states for the primary device as indicated by responses received from the secondary devices, and to cause the primary device to transition to one of the target operational state and one of the one or more allowable operational states.

22. The system of claim 21, wherein the coordination agent receives notification of a power state transition, identifies secondary devices as being dependent on a power state transition, sends the message to the secondary devices, receives the responses from the secondary devices.

23. The system of claim 21, wherein the primary device comprises a processor, the resource comprises a cache memory, and at least one of the secondary devices comprises a processor.

24. The system of claim 21, wherein the coordination agent is coupled to access at least one of an explicit and an implicit dependencies list to identify secondary devices as being dependent on a power state transition, the dependencies list to be dedicated to the primary device.

25. The system of claim 21 wherein the operational state comprises a power state.

26. The system of claim 21 wherein the operational state comprises a performance state.

27. The system of claim 21 wherein the coordination agent comprises circuitry in an electronic system.

28. The system of claim 21 wherein the coordination agent causes the primary device to transition to a highest power state from a target power state as indicated by the message and one or more allowable power states as indicated by the responses.

29. The system of claim 21 wherein the coordination agent causes the primary device to transition to a lowest power state from a target power state as indicated by the message and one or more allowable power states as indicated by the responses.

* * * * *